US012633466B2

(12) United States Patent
Matsumoto et al.

(10) Patent No.: US 12,633,466 B2
(45) Date of Patent: May 19, 2026

(54) MULTILAYER CERAMIC ELECTRONIC COMPONENT AND METHOD FOR MANUFACTURING MULTILAYER CERAMIC ELECTRONIC COMPONENT

(71) Applicant: TAIYO YUDEN CO., LTD., Tokyo (JP)

(72) Inventors: Yasuhiro Matsumoto, Tokyo (JP); Koichiro Morita, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 95 days.

(21) Appl. No.: 18/542,177

(22) Filed: Dec. 15, 2023

(65) Prior Publication Data

US 2024/0212938 A1 Jun. 27, 2024

(30) Foreign Application Priority Data

Dec. 27, 2022 (JP) ................................. 2022-210641

(51) Int. Cl.
*H01G 4/232* (2006.01)
*H01G 4/008* (2006.01)
*H01G 4/12* (2006.01)
*H01G 4/30* (2006.01)

(52) U.S. Cl.
CPC ......... *H01G 4/2325* (2013.01); *H01G 4/0085* (2013.01); *H01G 4/1209* (2013.01); *H01G 4/30* (2013.01)

(58) Field of Classification Search
CPC .. H01G 4/2325; H01G 4/0085; H01G 4/1209; H01G 4/30
See application file for complete search history.

(56) References Cited

U.S. PATENT DOCUMENTS

| | | | | |
|---|---|---|---|---|
| 6,930,876 B1 * | 8/2005 | Noguchi | .................. | H01G 4/12 |
| | | | | 361/321.5 |
| 2005/0117274 A1 * | 6/2005 | Miyauchi | ................. | H01G 4/12 |
| | | | | 361/321.2 |
| 2012/0250216 A1 * | 10/2012 | Ishii | .................... | C04B 35/4682 |
| | | | | 252/519.12 |
| 2014/0043722 A1 * | 2/2014 | Hirata | ...................... | H01G 4/30 |
| | | | | 361/301.4 |

(Continued)

FOREIGN PATENT DOCUMENTS

| | | |
|---|---|---|
| JP | 2008-258468 A | 10/2008 |
| JP | 2014-150240 A | 8/2014 |

*Primary Examiner* — Michael P Mcfadden
(74) *Attorney, Agent, or Firm* — CHEN YOSHIMURA LLP

(57) ABSTRACT

A multilayer ceramic electronic component includes a main body including a laminated portion in which a plurality of dielectric layers and a plurality of internal electrode layers are laminated; and a pair of external electrodes provided on surfaces of the main body, wherein in a capacitor section where the internal electrode layers electrically connected to one of the pair of external electrodes and the internal electrode layers electrically connected to another of the pair of external electrodes face each other, an average diameter d of dielectric particles in the dielectric layers in a center portion is smaller than an average diameter D of the dielectric particles in the dielectric layers in at least a part of an outer peripheral portion outside the center portion.

6 Claims, 9 Drawing Sheets

(56)      References Cited

U.S. PATENT DOCUMENTS

| | | | |
|---|---|---|---|
| 2014/0126104 A1* | 5/2014 | Kim ..................... | H01G 4/1209 |
| | | | 361/301.4 |
| 2018/0240592 A1* | 8/2018 | Morita ..................... | H01G 4/30 |
| 2019/0035554 A1* | 1/2019 | Inomata ................. | H01G 4/012 |
| 2021/0012968 A1* | 1/2021 | Taniguchi ............ | H01G 4/1227 |
| 2022/0157530 A1* | 5/2022 | Kim ....................... | H01G 4/008 |

* cited by examiner

MULTILAYER CERAMIC ELECTRONIC COMPONENT AND METHOD FOR MANUFACTURING MULTILAYER CERAMIC ELECTRONIC COMPONENT

BACKGROUND OF THE INVENTION

Technical Field

The present invention relates to a multilayer ceramic electronic component and a method for manufacturing the multilayer ceramic electronic component.

Background Art

DESCRIPTION OF THE RELATED ART

Multilayer ceramic capacitors (MLCCs) are used in high-frequency communication systems such as mobile phones to remove noise (see, for example, Patent Documents 1 and 2).

RELATED ART DOCUMENT

Patent Document

Patent Document 1: Japanese Patent Application Laid-Open Publication No. 2008-258468
Patent Document 2: Japanese Patent Application Laid-Open Publication No. 2014-150240

SUMMARY OF THE INVENTION

In recent years, there has been an increasing need for larger capacitance multilayer ceramic capacitors to be mounted on electronic circuit boards. In order to increase the capacitance in a multilayer ceramic capacitor, it is desirable to make the dielectric layer thin and multi-layered, and to increase the dielectric particle diameter. However, if the dielectric layer is made thinner and the particle size is increased, the number of particles per dielectric layer decreases, leading to concerns about deterioration in the reliability of multilayer ceramic capacitors such as a decrease in insulation resistance and withstand voltage. Therefore, structural control of the dielectric particle size has become extremely important.

For example, in Patent Document 1, the average particle diameter of dielectric particles near the peripheral portion of the internal electrode layer is made smaller than that of the dielectric particles near the center portion of the internal electrode layer, thereby preventing short-circuit defects and reliability defects. Patent Document 2 proposes a technique for improving the CR product by creating a special distribution of particle diameters of dielectric particles in the outermost dielectric layer between internal electrode layers, in the center, and in between.

However, these are all techniques for increasing the size of the dielectric particles in the center, and there is a problem in that the withstand voltage becomes low.

The present invention has been made in view of the above problems, and an object of the present invention is to provide a multilayer ceramic electronic component that can improve the withstand voltage and a method for manufacturing the same.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a multilayer ceramic electronic component, comprising: a main body including a laminated portion in which a plurality of dielectric layers and a plurality of internal electrode layers are laminated; and a pair of external electrodes provided on surfaces of the main body, wherein in a capacitor section where the internal electrode layers electrically connected to one of the pair of external electrodes and the internal electrode layers electrically connected to another of the pair of external electrodes face each other, an average diameter d of dielectric particles in the dielectric layers in a center portion is smaller than an average diameter D of the dielectric particles in the dielectric layers in at least a part of an outer peripheral portion outside the center portion.

In the above-described multilayer ceramic electronic component, the average diameter d and the average diameter D may satisfy $1.05 \leq D/d < 2$.

In the above-described multilayer ceramic electronic component, the average diameter d and the average diameter D may be 125 nm or more and 250 nm or less.

In the above-described multilayer ceramic electronic component, the plurality of dielectric layers may have a perovskite structure represented by the general formula $ABO_3$ with an A/B ratio being 0.90 or more and 0.98 or less.

In the above-described multilayer ceramic electronic component, the plurality of dielectric layers may contain barium titanate.

In the above-described multilayer ceramic electronic component, the plurality of internal electrode layers may be made of nickel or an alloy containing nickel as a main component.

In another aspect, the present disclosure provides a method for making a multilayer ceramic electronic component, comprising: obtaining a plurality of ceramic green sheets, each of which is formed by coating a slurry that is obtained by mixing a B-site solid solution element with a main material powder having a perovskite structure represented by the general formula $ABO_3$ so that an A/B ratio is 0.90 or more and 0.98 or less; forming an internal electrode pattern on each of the ceramic green sheets; laminating the ceramic green sheets on which the internal electrode patterns has been formed to obtain a laminate; firing the laminate at an oxygen partial pressure of 10-5 to 10-8 atm and a temperature range of 1150° C. to 1250° C. to obtain a main body; and forming an external electrode on the main body.

In the above method, the B-site solid solution element may be at least one of titanium and zirconium.

In the above method, the forming the external electrode may include applying an external electrode paste to the laminate; and thereafter firing the external electrode paste simultaneously with the firing of the laminate.

According to the present invention, it is possible to provide a multilayer ceramic electronic component that can improve the withstand voltage and a method for manufacturing the same.

It is to be understood that both the foregoing general description and the following detailed description are exemplary and explanatory, and are intended to provide further explanation of the invention as claimed.

DETAILED DESCRIPTION OF EMBODIMENTS

Hereinafter, embodiments will be described with reference to the drawings.

EMBODIMENTS

Figure 1:
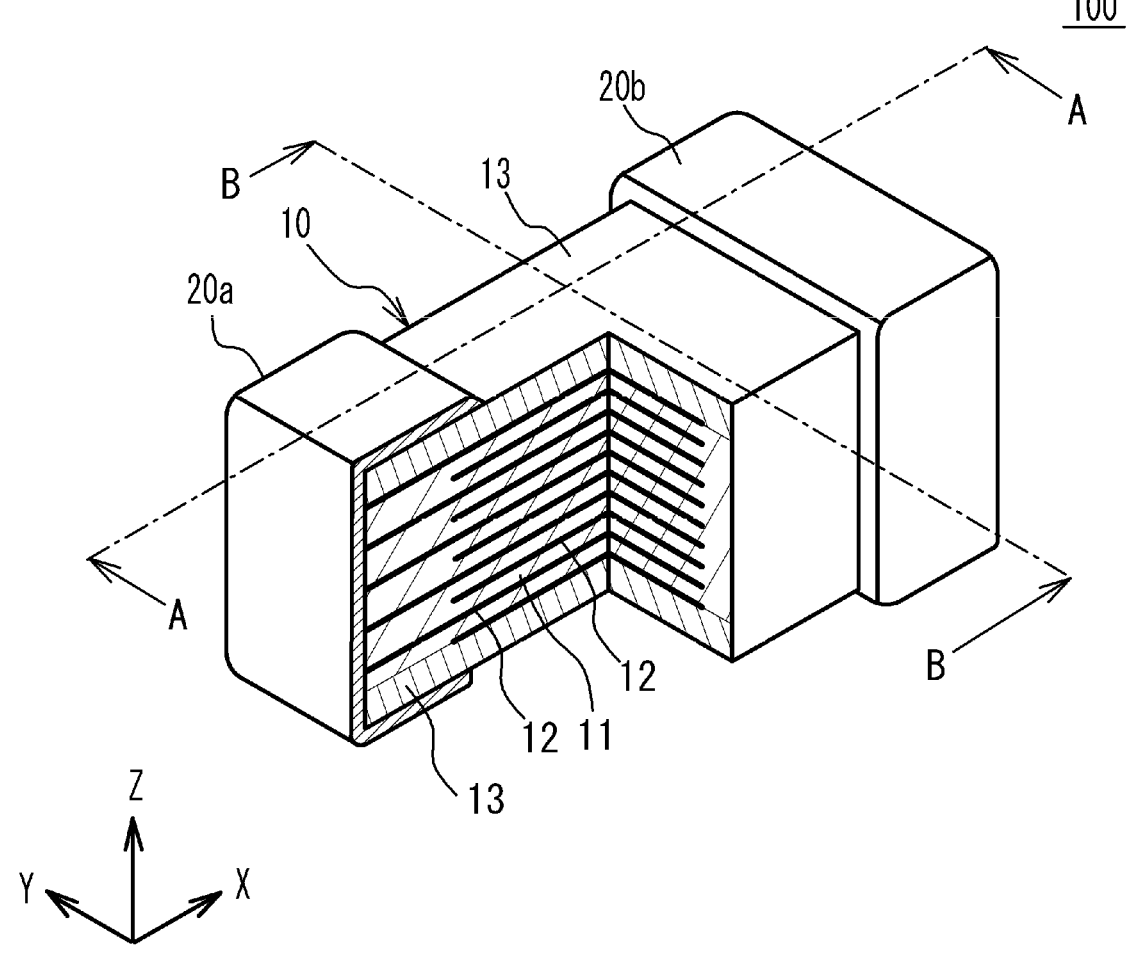
FIG. 1 is a partial cross-sectional perspective view of a multilayer ceramic capacitor.
Figure 2:
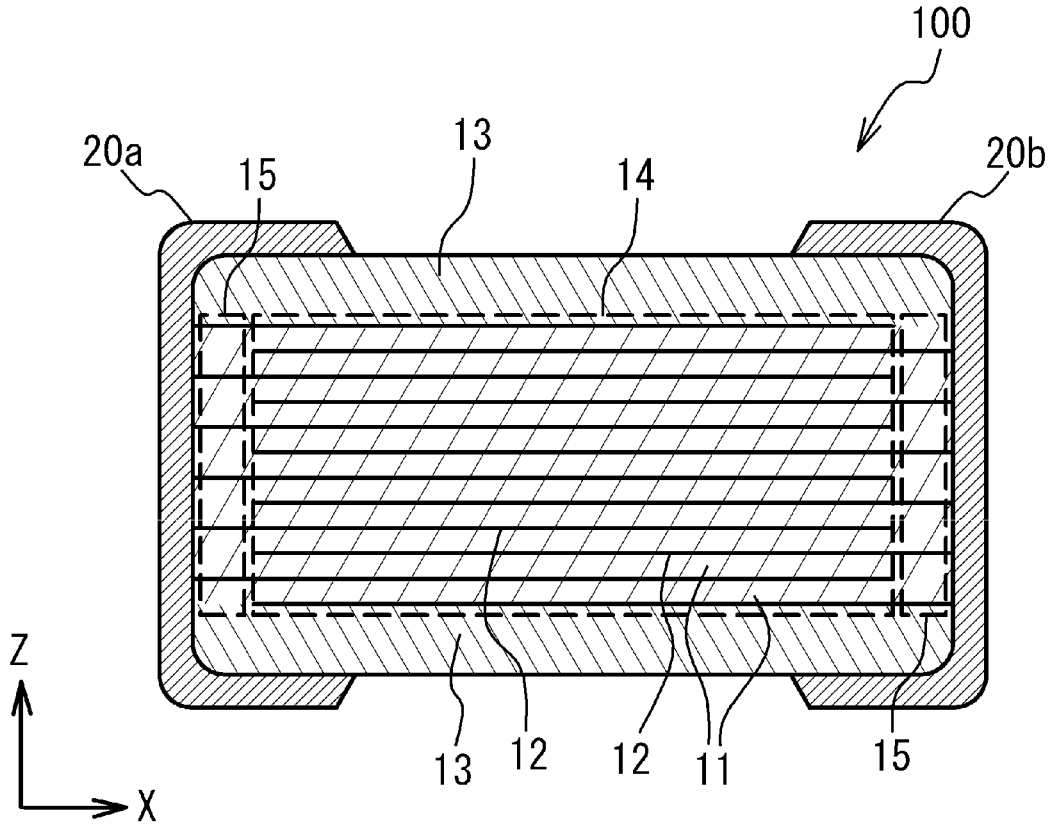
FIG. 2 is a cross-sectional view taken along line A-A in FIG. 1.
Figure 3:
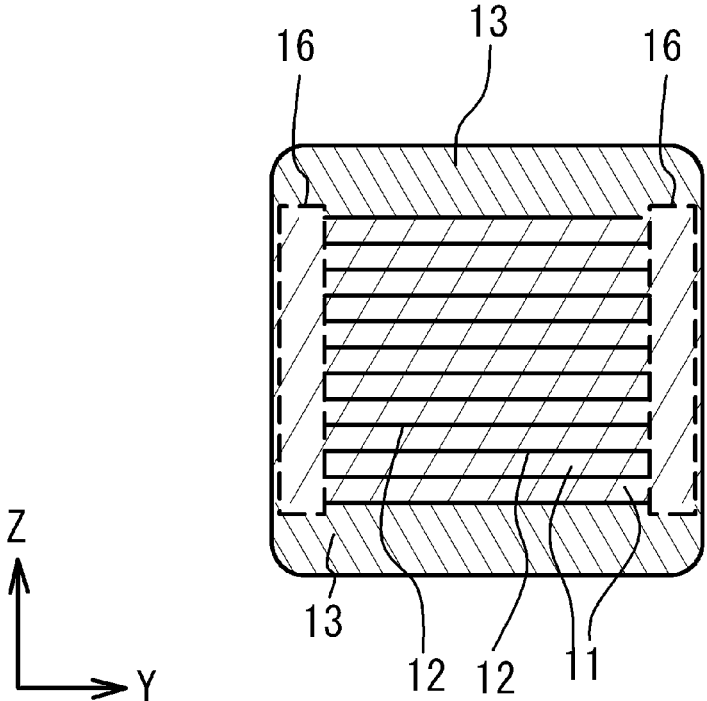
FIG. 3 is a sectional view taken along line B-B in FIG. 1.

FIG. 1 is a partially sectional perspective view of a multilayer ceramic capacitor 100 according to an embodiment. FIG. 2 is a cross-sectional view taken along line A-A in FIG. 1. FIG. 3 is a sectional view taken along line B-B in FIG. 1. As illustrated in FIGS. 1 to 3, the multilayer ceramic capacitor 100 includes a main body 10 having a substantially rectangular parallelepiped shape, and external electrodes 20a and 20b provided on two opposing end surfaces of the main body 10. Note that, of the four surfaces of the main body 10 other than the two end surfaces, two surfaces other than the top surface and the bottom surface in the stacking direction are referred to as side surfaces. The external electrodes 20a and 20b extend on the top surface, bottom surface, and two side surfaces of the main body 10 in the stacking direction. However, the external electrodes 20a and 20b are spaced apart from each other.

Note that in FIGS. 1 to 3, the Z-axis direction (first direction) is the lamination direction, and is the direction in which the internal electrode layers face each other. The X-axis direction (second direction) is the length direction of the main body 10, the direction in which the two end surfaces of the main body 10 face each other, and is the direction in which the external electrodes 20a and the external electrodes 20b face each other. The Y-axis direction (third direction) is the width direction of the internal electrode layer, and is the direction in which two of the four side surfaces of the main body 10 other than the two end surfaces face each other. The X-axis direction, the Y-axis direction, and the Z-axis direction are orthogonal to each other.

The main body 10 has a structure in which dielectric layers 11 containing a ceramic material that functions as a dielectric and internal electrode layers 12 are alternately laminated. The edges of each internal electrode layer 12 are alternately exposed on the end surface of the main body 10 where the external electrode 20a is provided and the end surface where the external electrode 20b is provided. Thereby, the respective internal electrode layers 12 are alternately electrically connected to the external electrodes 20a and 20b. As a result, multilayer ceramic capacitor 100 has a structure in which a plurality of dielectric layers 11 are stacked with internal electrode layers 12 in between. Further, in the laminate of the dielectric layers 11 and the internal electrode layers 12, the internal electrode layer 12 is disposed as each of the outermost layers in the stacking direction, and the top and bottom surfaces of the laminate are each covered with a cover layer 13. The cover layer 13 has a ceramic material as its main component. For example, the cover layer 13 may have the same composition as the dielectric layer 11 or may have a different composition. Note that the structure is not limited to the configurations shown in FIGS. 1 to 3 as long as the internal electrode layers 12 are exposed on two different surfaces and electrically connected to different external electrodes.

The size of the multilayer ceramic capacitor 100 is, for example, 0.25 mm long, 0.125 mm wide, 0.125 mm high, or 0.4 mm long, 0.2 mm wide, 0.2 mm high, or 0.6 mm long, 0.3 mm wide, 0.3 mm high, or 1.0 mm long, 0.5 mm wide, 0.5 mm high, or 3.2 mm long, 1.6 mm wide, 1.6 mm high, or 4.5 mm long, 3.2 mm wide, 2.5 mm high, but the size is not limited to these.

The internal electrode layer 12 has nickel (Ni) as its main component. A nickel alloy containing base metals and noble metals such as copper (Cu), tin (Sn), platinum (Pt), palladium (Pd), silver (Ag), and gold (Au) may be used. The average thickness per layer of the internal electrode layer 12 in the Z-axis direction is, for example, 1.5 μm or less, 1.0 μm or less, and 0.7 μm or less. The thickness of the internal electrode layer 12 was determined by observing the cross section of the multilayer ceramic capacitor 100 with a SEM (scanning electron microscope), measuring the thickness at 10 points for each of the 10 different internal electrode layers 12, and calculating the average value of all the measurement points.

The dielectric layer 11 has, for example, a ceramic material having a perovskite structure represented by the general formula $ABO_3$ as a main phase. Note that the perovskite structure includes $ABO_3$-a that deviates from the stoichiometric composition. For example, the ceramic materials may be selected from at least one of barium titanate ($BaTiO_3$), calcium zirconate ($CaZrO_3$), calcium titanate ($CaTiO_3$), strontium titanate ($SrTiO_3$), magnesium titanate ($MgTiO_3$), and $Ba_{1-x-y}Ca_xSr_yTi_{1-z}Zr_2O_3$ ($0 \leq x \leq 1$, $0 \leq y \leq 1$, $0 \leq z \leq 1$) forming a perovskite structure, etc. $Ba_{1-x-y}Ca_xSr_yTi_{1-z}Zr_2O_3$ includes barium strontium titanate, barium calcium titanate, barium zirconate, barium zirconate titanate, calcium zirconate titanate, and barium calcium zirconate titanate. For example, in the dielectric layer 11, the main component ceramic is 90 at % or more. The thickness of the dielectric layer 11 is, for example, 5.0 μm or less, 3.0 μm or less, and 1.0 μm or less. The thickness of the dielectric layer 11 is determined by observing the cross section of the multilayer ceramic capacitor 100 with a SEM (scanning electron microscope), measuring the thickness of each of the 10 different dielectric layers 11 at 10 points, and calculating the average value of all measurement points.

An additive may be added to the dielectric layer 11. The additive to the dielectric layer 11 may include zirconium (Zr), hafnium (Hf), magnesium (Mg), manganese (Mn), molybdenum (Mo), vanadium (V), chromium (Cr), oxides of rare earth elements (yttrium (Y), samarium (Sm), europium (Eu), gadolinium (Gd), terbium (Tb), dysprosium (Dy), holmium (Ho), erbium (Er), thulium (Tm) and ytterbium (Yb)), oxides containing cobalt (Co), nickel (Ni), lithium (Li), boron (B), sodium (Na), potassium (K) or silicon (Si), and glasses including cobalt, nickel, lithium, boron, sodium, potassium, or silicon.

As illustrated in FIG. 2, the region where the internal electrode layers 12 connected to the external electrode 20a and the internal electrode layers 12 connected to the external electrode 20b face each other is a region where capacitance occurs in the multilayer ceramic capacitor 100. Therefore, the region where the capacitance occurs is referred to as a capacitor section 14. That is, the capacitor section 14 is a region where adjacent internal electrode layers 12 connected to different external electrodes face each other.

A region where the internal electrode layers 12 connected to the external electrode 20a face each other without interposing the internal electrode layer 12 connected to the external electrode 20b is referred to as an end margin 15. Further a region where the internal electrode layers 12 connected to the external electrode 20b face each other without interposing the internal electrode layer 12 connected to the external electrode 20a is another end margin 15. That is, the end margin 15 is a region where internal electrode layers 12 connected to the same external electrode face each other without interposing the internal electrode layers 12 connected to a different external electrode. The end margin 15 is an area where no capacitance occurs.

As illustrated in FIG. 3, in the main body 10, regions provided to cover the lateral ends (ends in the Y-axis direction) of the dielectric layers 11 and the internal electrode layers 12 on the two sides are side margins 16, respectively. That is, the side margins 16 are regions provided outside the capacitor section 14 in the Y-axis direction. The side margin 16 is also a region where no electrostatic capacitance occurs.

In recent years, there has been an increasing need for larger capacitance multilayer ceramic capacitors to be mounted on electronic circuit boards. In order to increase the capacitance in a multilayer ceramic capacitor, it is desirable to make the dielectric layer thin and multi-layered, and to increase the dielectric particle diameter. However, when the dielectric layer is made thinner and the particle size is increased, the number of dielectric particles per dielectric layer decreases, and there are concerns that the reliability of multilayer ceramic capacitors may deteriorate due to a decrease in insulation resistance and withstand voltage. Therefore, structural control of the dielectric particle size has become extremely important.

For example, it is conceivable to make the average particle size of the dielectric particles near the peripheral part of the internal electrode layer smaller than that of the dielectric particles near the central part of the internal electrode layer so as to suppress short-circuit defects and reliability defects. Alternatively, it is conceivable to improve the CR product by creating a special distribution of particle diameters of the dielectric particles in the dielectric layers between the internal electrode layers in the outermost dielectric layer, the center portion, and in between. However, if the dielectric particles in the center are made larger, there is a problem in that the withstand voltage becomes lower.

Therefore, the multilayer ceramic capacitor 100 according to the present embodiment has a configuration that can improve the withstand voltage.

As a result of intensive research by the inventors, it has been found that when the ratio D/d of the average diameter D of the dielectric particles in the outer peripheral portion of the capacitor section 14 to the average diameter d of the dielectric particles in the central portion of the capacitor section 14 exceeds 1. It has been found that the withstand voltage is higher than when the ratio D/d is 1 or less. The reason for this is not completely understood, but when high voltage is applied, stress accumulates inside the sample due to the inverse piezoelectric effect and electrostrictive effect. As the dielectric particle size increases, ferroelectricity increases, and the inverse piezoelectric effect and electrostrictive effect increase. It is presumed that when large dielectric particles are located in the center, stress tends to concentrate in the center of the sample, which tends to lead to dielectric breakdown.

Figure 4A:
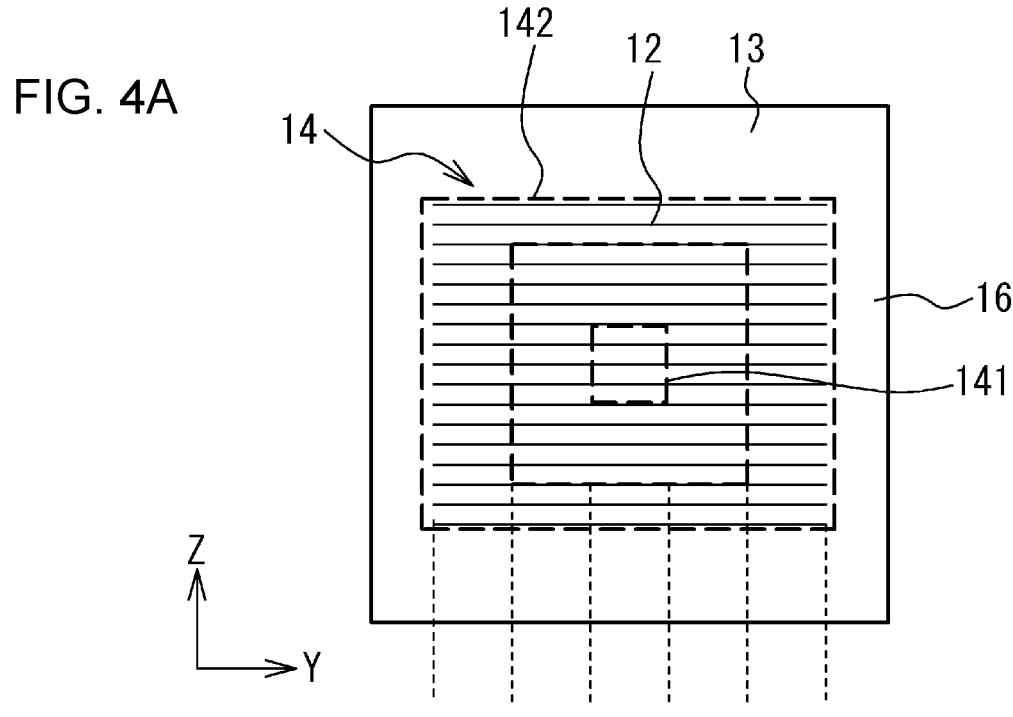
FIGS. 4A to 4C are diagrams for explaining the average diameter d and the average diameter D.

FIG. 4A is a schematic cross-sectional view taken along line B-B in FIG. 1. As illustrated in FIG. 4A, in the capacitor section 14, a predetermined area at the center is defined as a center portion 141. In the capacitive portion 14, a region surrounding the center portion 141 from the outside is defined as an outer peripheral portion 142. The outer peripheral portion 142 may be in contact with the center portion 141, but does not need to be in contact with the center portion 141. For example, as illustrated in FIG. 4A, when the capacitor section 14 is divided into five equal parts in the Y-axis direction and the Z-axis direction, the center area may be defined as the center portion 141, and the outermost peripheral area may be defined as the outer peripheral portion 142.

Figure 4B:
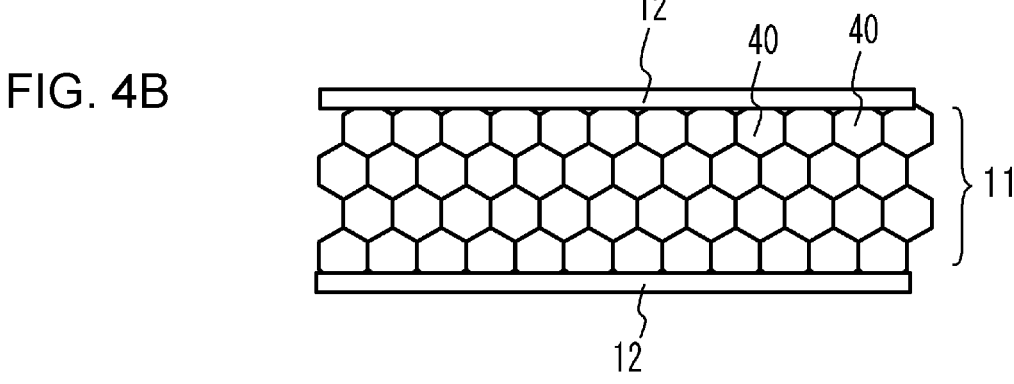
Figure 4C:
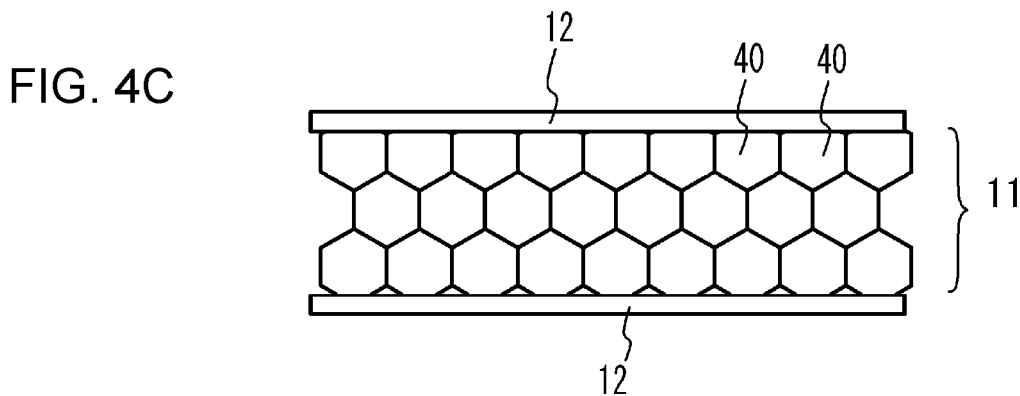

Each dielectric layer 11 has a structure in which a plurality of dielectric particles 40 are sintered. FIG. 4B is a cross-sectional view of the dielectric layer 11 in the central portion 141. The average diameter of the dielectric particles 40 included in the dielectric layer 11 in the center portion 141 is defined as an average diameter d. FIG. 4C is a cross-sectional view of the dielectric layer 11 of the outer peripheral portion 142. The average diameter of the dielectric particles 40 included in the dielectric layer 11 of the outer peripheral portion 142 is defined as an average diameter D.

Here, a method for measuring the average diameter d and the average diameter D will be explained. The multilayer ceramic capacitor 100 is cut parallel to the end surfaces on which the external electrodes are formed, and the cross section is polished. The cross section corresponds to a YZ cross section. The particle size of the dielectric particles is measured based on a cross-sectional photograph of the dielectric layer taken with a scanning electron microscope (SEM) for the cross-section. Based on the SEM image, the maximum length of the dielectric particles in the stacking direction is defined as the particle diameter, and the arithmetic mean value of each measured particle diameter is defined as the average diameter of the dielectric particles. The polishing position here was set in a central region of five equal parts divided in the X-axis direction from the end faces of the external electrodes so as to be near the center. In this embodiment, as shown in FIG. 4A, the capacitor section 14 is concentrically divided into three equal-width parts, the average diameter of the dielectric particles 40 in the center portion 141 is the average diameter d, and the average diameter of the dielectric particles 40 in the outer peripheral portion 142 is the average diameter D.

Figure 5:
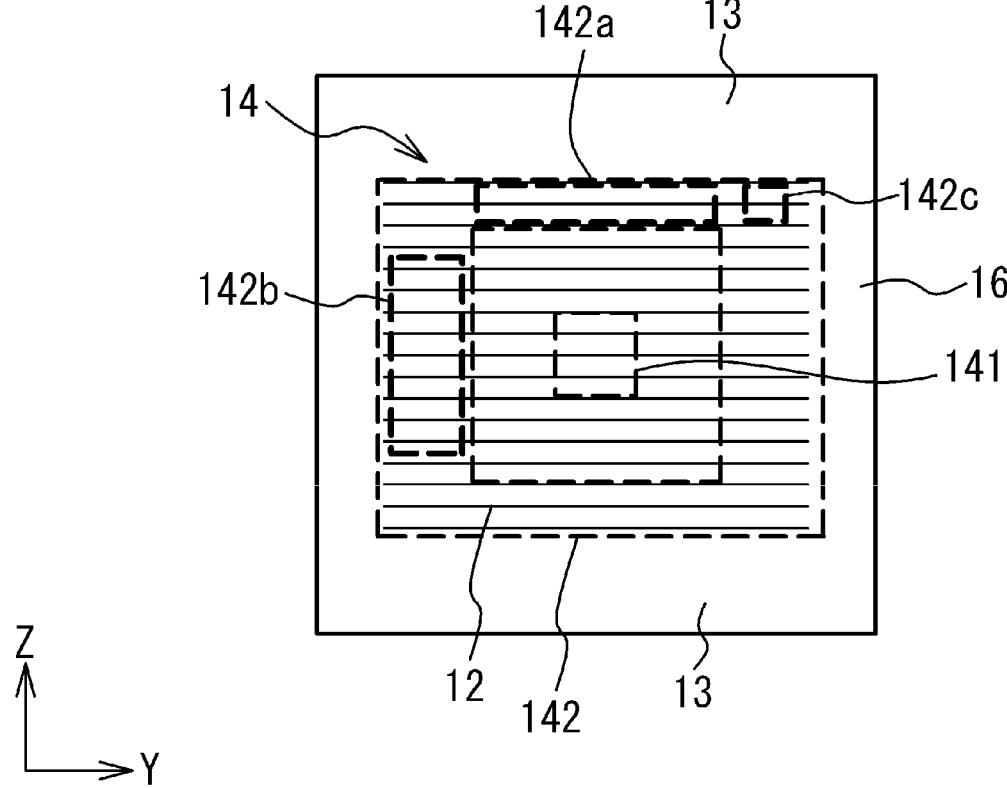
FIG. 5 is a diagram for explaining the area in which the average diameter D is measured.

The area in which the average diameter D is measured in the outer peripheral portion 142 may be at least a part of the outer peripheral portion 142. As illustrated in FIG. 5, the area in which the average diameter D is measured in the outer peripheral portion 142 may be the vicinity portion 142a of the cover layer 13, the vicinity portion 142b of the side margin 16, or the corner portion 142c.

As an example of a method for realizing a microstructure with a ratio D/d>1, it can be obtained by setting the A/B ratio of the dielectric composition to 0.98 or less and firing in a specific firing atmosphere. Here, A/B is the molar ratio of A-site element/B-site element of a perovskite compound represented by the general formula $ABO_3$, such as $BaTiO_3$-based dielectric material where Ba, Sr, Ca, etc., are A-site elements, Ti, Zr, etc., are B-site elements. Although the reason for this has not been completely elucidated, in the center of the multilayer ceramic capacitor 100, carbon derived from the binder tends to remain during firing, and the effective oxygen partial pressure tends to decrease. Generally, in the case of conventional materials, the lower the oxygen partial pressure (stronger reduction), the more likely oxygen defects are generated and grains grow easier, so the ratio D/d≤1 is normally satisfied. This is called the particle size in-and-out difference. Furthermore, the larger the size of the multilayer ceramic capacitor 100 is, the more likely it is that carbon will remain in the center, so the in-and-out differences in particle size between the inside and outside are more likely to occur. Specifically, in a multilayer ceramic capacitor 100 having dimensions greater than 1.0 mm long, 0.5 mm in wide, and 0.5 mm height, the in-and-out differences in grain size between the inside and outside are more likely to occur. On the other hand, a dielectric material having an A/B ratio of 0.98 or less has a special property in that the higher the oxygen partial pressure (weak reduction), the more easily grains grow. The reason for this is assumed to be that the nickel used in the internal electrode layers 12 is easily oxidized and diffused under high oxygen partial pressure, which promotes grain growth.

Due to these probable reasons, it becomes possible to realize a multilayer ceramic capacitor 100 that has a special particle size distribution with the in-and-out difference between inside and outside particle sizes that is opposite to that of a normal multilayer ceramic capacitor, thereby providing a multilayer ceramic capacitor having a high withstand voltage.

If the ratio D/d is small, there is a risk that sufficient withstand voltage may not be obtained. Therefore, it is preferable to set a lower limit to the ratio D/d. In this embodiment, the ratio D/d is preferably 1.05 or more, more preferably 1.10 or more, and even more preferably 1.15 or more.

On the other hand, if the ratio D/d is large, there is a risk that sufficient capacitance or withstand voltage may not be obtained. Therefore, it is preferable to set an upper limit on the ratio D/d. In this embodiment, the ratio D/d is preferably 2.00 or less, more preferably 1.92 or less, and even more preferably 1.85 or less.

If the average diameter d and the average diameter D are small, a sufficient dielectric constant may not be obtained in the dielectric layer 11, and there is a possibility that sufficient capacitance may not be obtained. Therefore, it is preferable to set a lower limit to the average diameter d and the average diameter D. In this embodiment, the average diameter d and the average diameter D are preferably 125 nm or more, more preferably 130 nm or more, and even more preferably 135 nm or more.

If the average diameter d and the average diameter D are large, the withstand voltage may not be satisfied even if the ratio D/d is 1.05 or more. Therefore, it is preferable to set an upper limit on the average diameter d and the average diameter D. In this embodiment, the average diameter d and the average diameter D are preferably 250 nm or less, more preferably 240 nm or less, and even more preferably 230 nm or less.

In order to realize a microstructure with a ratio D/d>1, the A/B ratio of the dielectric composition in each dielectric layer 11 is preferably 0.98 or less, more preferably 0.975 or less, more preferably 0.970 or less.

On the other hand, if the A/B ratio is small, a sufficient dielectric constant may not be obtained, and there is a possibility that sufficient capacitance may not be obtained. Therefore, it is preferable to set a lower limit to the A/B ratio of the dielectric composition in each dielectric layer 11. In this embodiment, the A/B ratio is preferably 0.90 or more, more preferably 0.92 or more, and even more preferably 0.94 or more.

Figure 6:
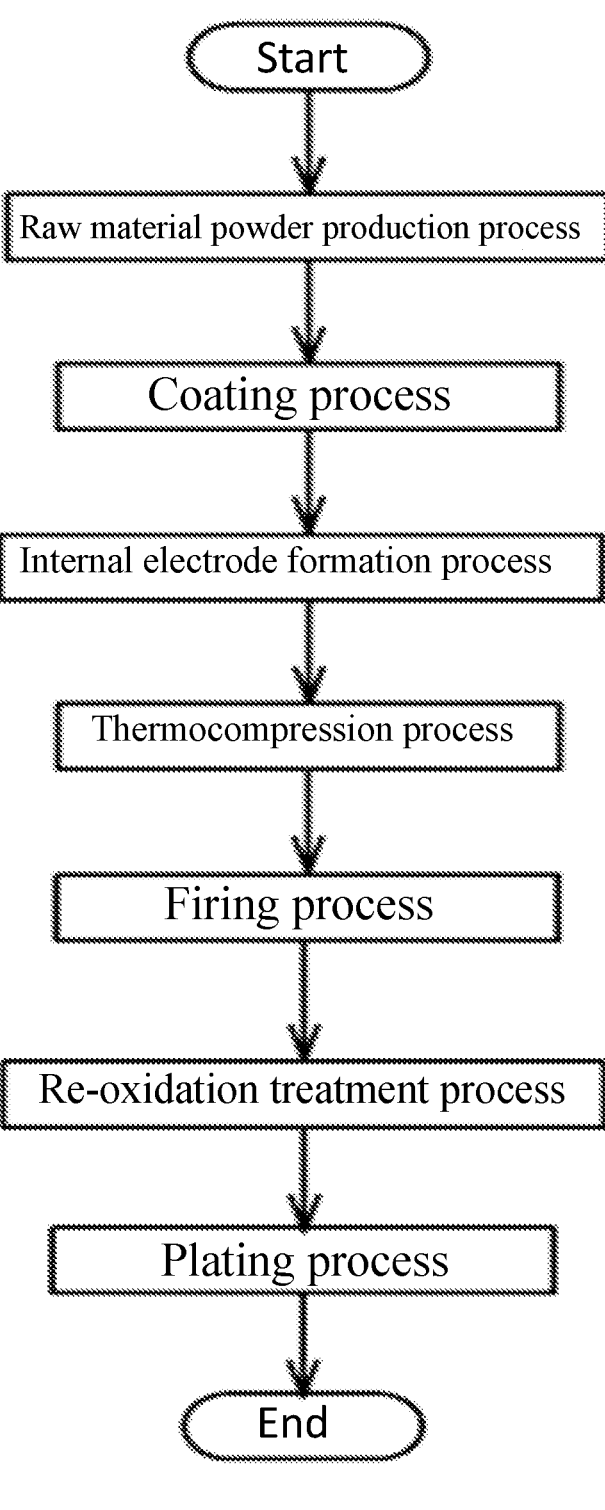
FIG. 6 is a diagram illustrating a flow of a method for manufacturing a multilayer ceramic capacitor.

Next, a method for manufacturing the multilayer ceramic capacitor 100 will be described. FIG. 6 is a diagram illustrating a flow of a method for manufacturing the multilayer ceramic capacitor 100.

(Raw Material Powder Production Process)

First, a dielectric material for forming the dielectric layer 11 is prepared. The A-site element and the B-site element contained in the dielectric layer 11 are normally contained in the dielectric layer 11 in the form of a sintered body of $ABO_3$ particles. For example, barium titanate is a tetragonal compound having a perovskite structure and exhibits a high dielectric constant. This barium titanate can generally be obtained by reacting a titanium raw material such as titanium dioxide with a barium raw material such as barium carbonate to synthesize barium titanate. Various methods are conventionally known for synthesizing the main component ceramic of the dielectric layer 11, such as a solid phase method, a sol-gel method, and a hydrothermal method. In this embodiment, any of these can be adopted.

A predetermined additive compound is added to the obtained ceramic powder depending on the purpose. The additive compounds include zirconium, hafnium, magnesium, manganese, molybdenum, vanadium, chromium, oxides of rare earth elements (yttrium, samarium, europium, gadolinium, terbium, dysprosium, holmium, erbium, thulium, and ytterbium), or oxides containing cobalt, nickel, lithium, boron, sodium, potassium or silicon, or glasses containing cobalt, nickel, lithium, boron, sodium, potassium or silicon. The ingredients are blended so that the A/B ratio is 0.90 or more and 0.98 or less.

For example, a ceramic material is prepared by wet-mixing a compound containing an additive compound with a ceramic raw material powder, drying and pulverizing the mixture. For example, the ceramic material obtained as described above may be pulverized to adjust the particle size, if necessary, or may be combined with a filtering process to adjust the particle size. Through the above steps, a dielectric material is obtained.

Next, a dielectric pattern material for forming the side margin 16 is prepared. The dielectric pattern material includes a main component ceramic powder of the side margins 16. As the main component ceramic powder, for example, a power of a main component ceramic of a dielectric material can be used. Predetermined additive compounds are added depending on the purpose. At least, the vanadium concentration relative to the main component ceramic in the dielectric pattern material is made higher than the vanadium concentration relative to the main component ceramic in the dielectric material.

(Coating Process)

Next, a binder such as polyvinyl butyral (PVB) resin, an organic solvent such as ethanol or toluene, and a plasticizer are added to the obtained raw material powder and wet-mixed. Using the obtained slurry, a ceramic green sheet 51 is coated on a base member by, for example, a die coater method or a doctor blade method, and then dried. The base member is, for example, a polyethylene terephthalate (PET) film. Figures illustrating the coating process are omitted.

(Internal Electrode Formation Process)

Figure 7A:
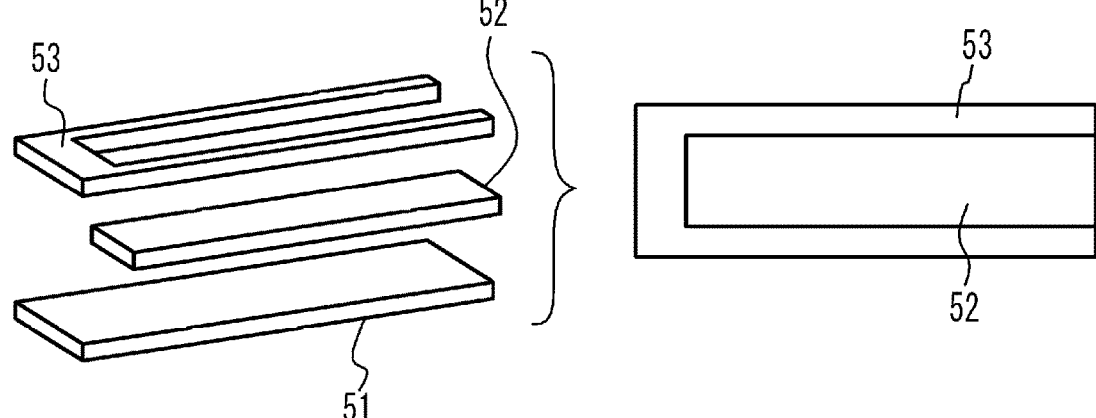
FIGS. 7A and 7B are diagrams illustrating an internal electrode forming process.

Next, as illustrated in FIG. 7A, a metal conductive paste for forming internal electrodes containing an organic binder is printed on the surface of the ceramic green sheet 51 by screen printing, gravure printing, etc., to form an internal electrode pattern 52 for an internal electrode layer. In addition to nickel, ceramic particles are added as a co-material to the metal conductive paste. Although the main component of the ceramic particles is not particularly limited, it is preferably the same as the main component ceramic of the dielectric layer 11.

Next, a binder such as ethyl cellulose and an organic solvent such as terpineol are added to the dielectric pattern material obtained in the raw material powder manufacturing process, and the mixture is kneaded in a roll mill to form a dielectric pattern paste for the reverse pattern layer. As illustrated in FIG. 7A, on the ceramic green sheet 51, the dielectric pattern 53 is arranged by printing a dielectric pattern paste in the peripheral area where the internal electrode pattern 52 is not printed, so as to fill in the gap with 52. The ceramic green sheet 51 on which the internal electrode pattern 52 and the dielectric pattern 53 are printed is referred to as a unit of lamination.

Figure 7B:
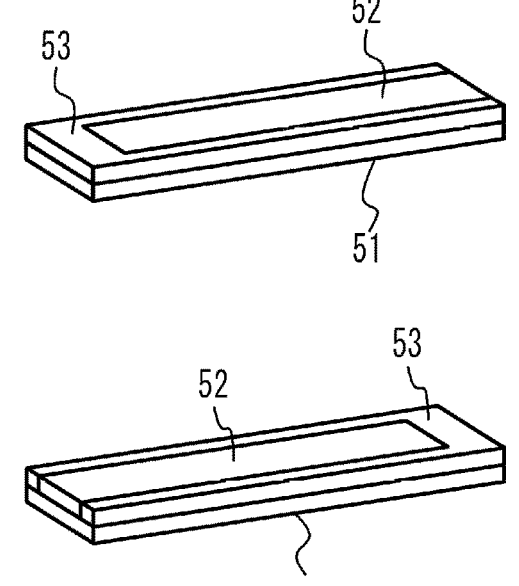

Thereafter, as illustrated in FIG. 7B, the lamination units are limited such that the internal electrode layers 12 and the dielectric layers 11 are arranged alternately, and that edges of the internal electrode layers 12 in the longitudinal direction of the dielectric layers 11 are alternately exposed and drawn out alternately to a pair of external electrodes 20a and 20b having different polarities, respectively. The number of stacked layers of the internal electrode pattern 52 is set to 100 to 500 layers, for example.

(Thermocompression Process)

Figure 8:
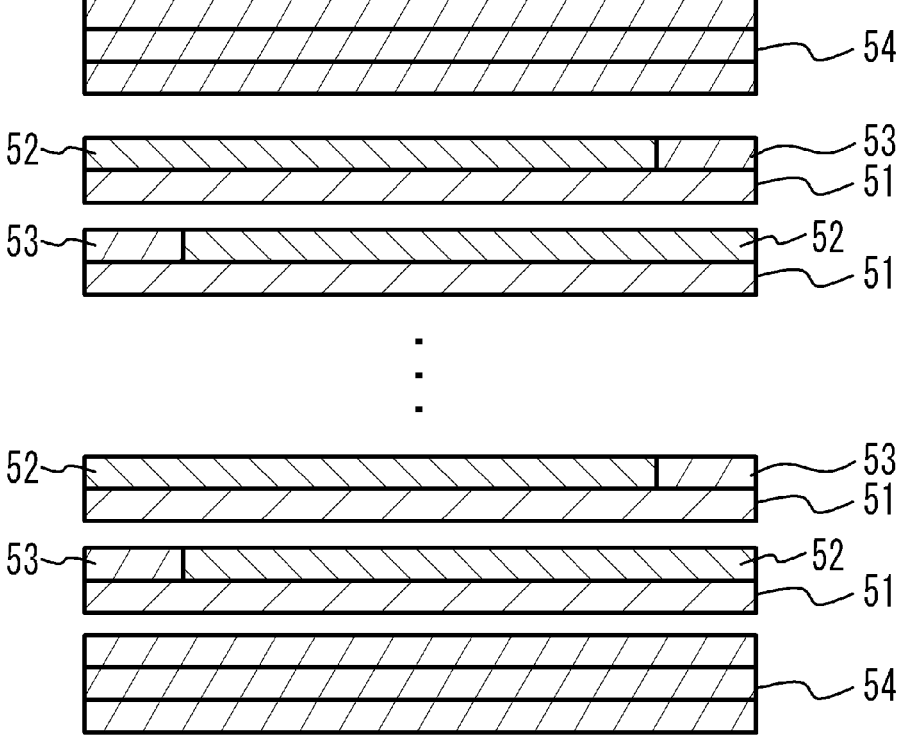
FIG. 8 is a diagram illustrating a thermocompression process.

As illustrated in FIG. 8, a predetermined number (for example, 2 to 10 layers) of cover sheets 54 are laminated above and below the laminate in which the lamination units are laminated and bonded by thermocompression.

(Firing Process)

After removing the binder from the ceramic laminate thus obtained in an $N_2$ atmosphere, a metal paste that will become the base layer of the external electrodes 20a and 20b is applied by a dip method, and the oxygen partial pressure is adjusted to 10-5 to 10-8 atm, baking is performed in a reducing atmosphere at a temperature range of 1150° C. to 1250° C. for 5 minutes to 10 hours. Here, high-speed firing is performed at a heating rate of 6000° C./h or more in order to make it easier for carbon to remain in the center and to cause differences in grain size between the inside and the periphery.

(Re-Oxidation Treatment Process)

In order to return oxygen to the partially reduced main phase barium titanate of the dielectric layer 11 fired in the reducing atmosphere, a heat treatment may be performed in a mixed gas of $N_2$ and water vapor at about 1000° C. or in the atmosphere at 500° C. to 700° C. to an extent that the internal electrode layer 12 is not oxidized. This process is called a reoxidation process.

(Plating Process)

Thereafter, a metal coating such as copper, nickel, tin, etc., is applied to the base layer of the external electrodes 20a, 20b by plating. Through the above steps, the multilayer ceramic capacitor 100 is completed.

According to the manufacturing method according to the present embodiment, a B-site solid solution element is added to the main material powder having a perovskite structure represented by the general formula $ABO_3$ so that the A/B ratio is 0.90 or more and 0.98 or less in forming a slurry, and the resulting slurry is coated to obtain the ceramic green sheets 51. The ceramic green sheets 51 with internal electrode patterns 52 formed thereon are laminated to obtain a laminate, and the laminate is fired under an oxygen partial pressure of 10-5 to 10-8 atm, at a heating rate of 6000° C./h or more, and in a temperature range of 1150° C. to 1250° C.

to obtain the main body 10. According to this method, a microstructure with a ratio D/d>1 can be realized.

Figure 9:
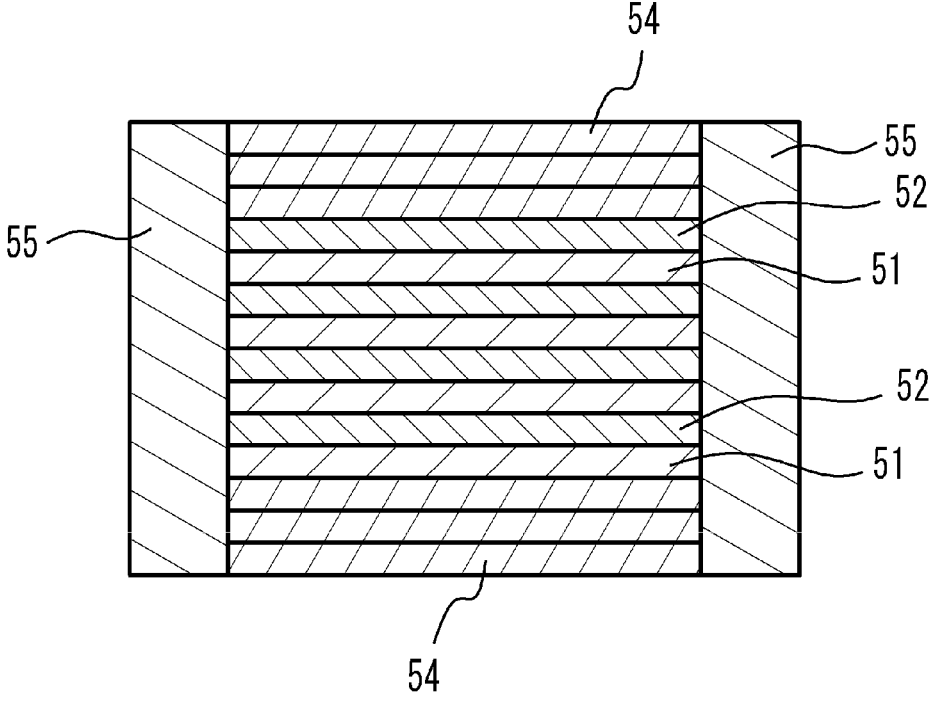
FIG. 9 is a diagram illustrating a side margin section.

The side margins may be attached or coated on the side surfaces of the laminated body. Specifically, as illustrated in FIG. 9, a laminate is obtained by alternately laminating ceramic green sheets 51 and internal electrode patterns 52 having the same width as the ceramic green sheets 51. Next, a sheet formed of dielectric pattern paste may be attached as the side margin 55 to each of the side surfaces of the laminate.

Note that in each of the above embodiments, a multilayer ceramic capacitor has been described as an example of a multilayer ceramic electronic component, but the present invention is not limited thereto. For example, the present invention is applicable to other laminated ceramic electronic components such as varistors and thermistors.

WORKING EXAMPLES

Working Examples 1-3 and Comparative Examples 1-2

Hereinafter, working examples of the multilayer ceramic capacitors according to the embodiments was manufactured and its characteristics were investigated.

Sample Preparation Method

Barium titanate having an average particle size of 100 nm was weighed as the main raw material, and various additives and an organic solvent were mixed in a predetermined ratio. The ingredients were blended by adding B-site solid solution elements such as Ti and Zr as additives such that in Working Example 1, the A/B ratio was 0.9625; in Working Example 2 the A/B ratio was 09619, In Working Example 3, the A/B ratio was 0.9615, in Comparative Example 1, the A/B ratio was 0.9614, and in Comparative Example 2, the A/B ratio was 0.9609.

The prepared dielectric raw material powder was wet mixed with an organic solvent. The slurry obtained by adding a binder was coated into a ceramic green sheet having a thickness of 1.0 μm using a doctor blade method and dried. An internal electrode pattern was formed by screen printing a conductive paste film containing Ni on the ceramic green sheet in a predetermined pattern. Furthermore, in order to fill in the difference in level between the ceramic green sheet and the internal electrode pattern, a reverse pattern sheet having a pattern complementary to the internal electrode pattern was screen printed on the ceramic green sheet. Approximately 300 such layers were laminated, thermocompressed, and were cut. As a result, an MLCC body with dimensions of 1.0 mm in length, 0.5 mm in width, and 0.5 mm in height was obtained for each example.

Sample Firing Method

The binder was removed from the MLCC bodies at a temperature of 300° ° C. in an $N_2$ atmosphere. Thereafter, the MLCC bodies was fired in a temperature range of 1150° C. to 1250° C. This was performed in a reducing atmosphere with an oxygen partial pressure of 10-5 atm to 10-8 atm, in which atmosphere control is important because it greatly changes grain growth behavior. After the temperature was lowered, the temperature was raised to a temperature range of 800° ° C. to 1050° C. in a $N_2$ atmosphere, and the temperature was maintained to perform reoxidation treatment. In order to form external electrodes in the thus obtained sintered body, an Ni paste containing glass frit was applied to both end faces where the internal electrode layers were exposed, and baked in an $N_2$ atmosphere. As a result, samples of the respective multilayer ceramic capacitors were obtained.

Evaluation Method of Dielectric Particle Size

The multilayer ceramic capacitor was cut parallel to the end surfaces where the external electrodes were formed, the cross section was polished, and the particle size of the dielectric particles was measured based on a cross-sectional photograph of the dielectric layers taken with a scanning electron microscope (SEM). The maximum length of the dielectric particles in the stacking direction was measured based on the SEM image, and the arithmetic mean value thereof was evaluated as the average diameter of the dielectric particles. The polishing position here was set in the central part of five equal parts divided from the end surfaces of the external electrodes so as to be near the center. As shown in FIG. 4A, the capacitor section was concentrically divided into three equal-width parts, and the average diameter of the dielectric particles in the center portion was defined as the average diameter d, and the average diameter of the dielectric particles in the outer peripheral portion was defined as the average diameter D. The outer peripheral portion may be a portion near the cover, a portion near the side, or a corner portion. Further, in Working Example 1, the measurements were also made at the outer peripheral portions near the cover and the side portion, but since no heat treatment. The measurement conditions were 1 kHz-0.5 Vrms based on the JIS standard based on the rated capacitance and rated voltage of this product. The capacitance is 10.5 µF in Working Example 1, 10.4 µF in Working Example 2, 7.9 µF in Working Example 3, 11.2 µF in Comparative Example 1, and 10.8 µF in Comparative Example 2.

Evaluation Results

For the samples whose breakdown voltage exceeded 35V, the withstand voltage test was judged to have passed the test. For the samples with a breakdown voltage of 35V or less, the withstand voltage test was determined to fail with "x". The samples with a capacitance of 10 µF or more were judged to have passed the capacitance test with "○". For the samples with a capacitance of less than 10 µF, the capacitance test was rated as slightly good "Δ".

In Working Examples 1 to 3, the withstand voltage test was judged with "○", and therefore all passed. This is considered to be because the ratio D/d exceeded 1.0. On the other hand, in Comparative Examples 1 and 2, the withstand voltage test was determined to be a failure "x". This is considered to be because the ratio D/d became 1.0 or less.

Next, in Working Examples 1 and 2, the capacitance test was judged to be a pass "○", but in Working Example 3, the capacitance test was judged to be fair "Δ". This is considered to be because the average diameter d was less than 125 nm.

TABLE 1

| | A/B ratio | Average diameter D in the periphery (nm) | Average diameter d at the center (nm) | Particle size ratio D/d | Withstand voltage test breakdown voltage (V) | Pressure test judgment | Capacitance (µF) | Capacitance judgment |
|---|---|---|---|---|---|---|---|---|
| Working Example 1 | 0.9625 | 205 | 177 | 1.16 | 39 | ○ | 10.5 | ○ |
| Working Example 2 | 0.9619 | 188 | 179 | 1.05 | 36 | ○ | 10.4 | ○ |
| Working Example 3 | 0.9615 | 135 | 121 | 1.14 | 43 | ○ | 7.9 | Δ |
| Comparative example 1 | 0.9614 | 197 | 245 | 0.8 | 22 | X | 11.2 | ○ |
| Comparative example 2 | 0.9609 | 207 | 209 | 0.99 | 33 | X | 10.8 | ○ | significant difference was observed between the two, the values near the cover portion are shown as a representative.

The average diameter D was 205 nm in Working Example 1, 188 nm in Working Example 2, 135 nm in Working Example 3, 197 nm in Comparative Example 1, and 207 nm in Comparative Example 2. The average diameter d was 177 nm in Working Example 1, 179 nm in Working Example 2, 121 nm in Working Example 3, 245 nm in Comparative Example 1, and 209 nm in Comparative Example 2. The ratio D/d is 1.16 in Working Example 1, 1.05 in Working Example 2, 1.14 in Working Example 3, 0.8 in Comparative Example 1, and 0.99 in Comparative Example 2.

Withstand Voltage Test

The breakdown voltage was measured as the voltage was increased by 1V every second from 1 to 200V at a temperature of 25° C. At this time, samples whose the breakdown voltage exceeded 35V were judged to have a good withstand voltage. The breakdown voltage was 39V in Working Example 1, 36V in Working Example 2, 43V in Working Example 3, 22V in Comparative Example 1, and 33V in Comparative Example 2.

Capacitance Measurement Method

Measurements of the capacitances were performed using an LCR meter 24 hours after the samples went through a Although the embodiments of the present invention have been described in detail above, the present invention is not limited to these specific embodiments, and various modifications and changes can be made within the scope of the gist of the present invention as described in the claims. It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A multilayer ceramic electronic component, comprising:

a main body including a laminated portion in which a plurality of dielectric layers and a plurality of internal electrode layers are laminated in a first direction; and a pair of external electrodes provided on end surfaces of the main body, the end surfaces being parallel to each other and face each other along a second direction perpendicular to the first direction wherein in a capacitor section where the internal electrode layers electrically connected to one of the pair of external electrodes and the internal electrode layers electrically connected to another of the pair of external electrodes face each other, an average diameter d of dielectric particles in the dielectric layers in a generally rectangular center portion, which is located at and adjacent to a center in a cross section taken along a plane perpendicular to the second direction, is smaller than an average diameter D of the dielectric particles in the dielectric layers in at least a part of an outer peripheral portion outside the center portion in the cross section, the outer peripheral portion surrounding the generally rectangular center portion along all directions in said plane along which the cross section is taken.

2. The multilayer ceramic electronic component according to claim 1, wherein the average diameter d and the average diameter D satisfy $1.05 \leq D/d < 2$.

3. The multilayer ceramic electronic component according to claim 1, wherein the average diameter d and the average diameter D are 125 nm or more and 250 nm or less.

4. The multilayer ceramic electronic component according to claim 1, wherein the plurality of dielectric layers have a perovskite structure represented by the general formula $ABO_3$ with an A/B ratio being 0.90 or more and 0.98 or less.

5. The multilayer ceramic electronic component according to claim 1, wherein the plurality of dielectric layers contain barium titanate.

6. The multilayer ceramic electronic component according to claim 1, wherein the plurality of internal electrode layers are made of nickel or an alloy containing nickel as a main component.

* * * * *